United States Patent [19]

Patrick

[11] 4,030,313
[45] June 21, 1977

[54] AIR CONDITIONER

[76] Inventor: Ernest H. Patrick, Rte. 1, Box 312-B, Conway, S.C. 29526

[22] Filed: Apr. 9, 1976

[21] Appl. No.: 675,616

[52] U.S. Cl. .................................................. 62/7
[51] Int. Cl.² ......................................... F25B 19/00
[58] Field of Search ............................. 62/7, 45, 50

[56] References Cited

UNITED STATES PATENTS

| | | | |
|---|---|---|---|
| 2,565,767 | 8/1951 | Gaskell, Jr. | 62/7 |
| 3,021,681 | 2/1962 | Perry | 62/7 |
| 3,077,745 | 2/1963 | Grantham et al. | 62/7 |
| 3,306,056 | 2/1967 | Kennedy | 62/7 |
| 3,373,573 | 3/1968 | Nickel | 62/7 |
| 3,605,421 | 9/1971 | Patrick | 62/7 |
| 3,912,475 | 10/1975 | Patrick | 62/7 |

*Primary Examiner*—Lloyd L. King
*Attorney, Agent, or Firm*—Oltman and Flynn

[57] ABSTRACT

An air conditioner for use in a vehicle having a gasoline engine with a fuel intake providing a source of reduced pressure. The air conditioner includes a gasoline vaporizer in which gasoline from the fuel system of the vehicle is vaporized and drawn through a heat exchanger for cooling purposes. There is a blower for blowing air across the heat exchanger to cool the air for circulation in the vehicle. The vaporized gasoline passes through a separator for separating excess gasoline from the mixture, and also passes through a proportioning device connected to the fuel intake of the engine for adjusting the fuel-to-air ratio at the fuel intake to optimize combustion and control pollution.

31 Claims, 12 Drawing Figures

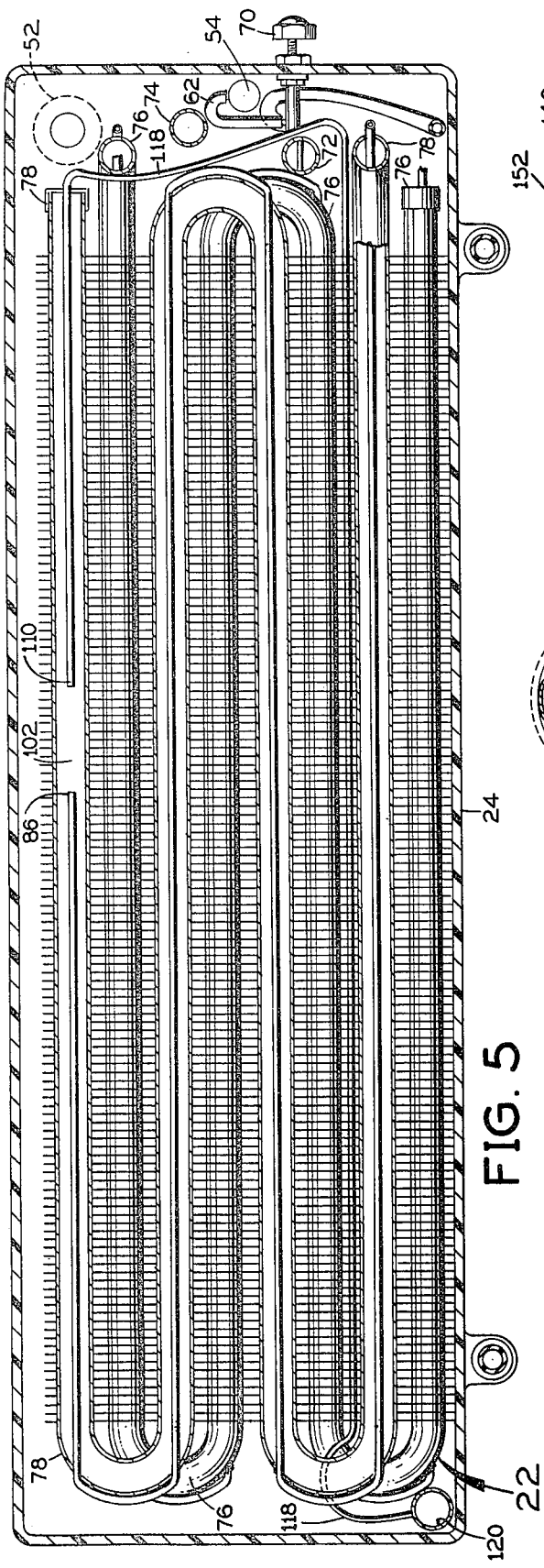
FIG. 5
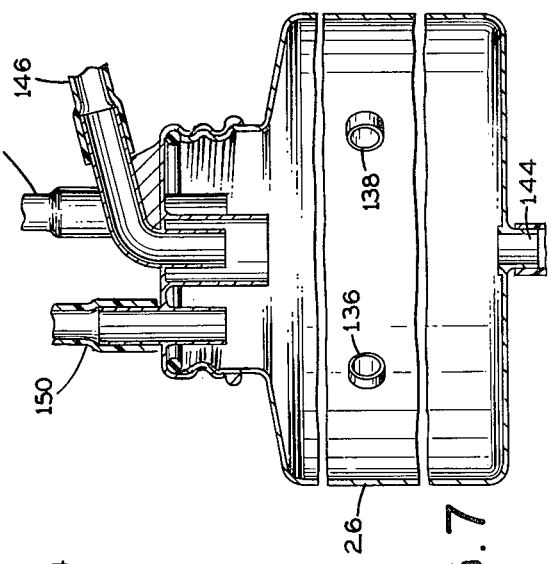
FIG. 7
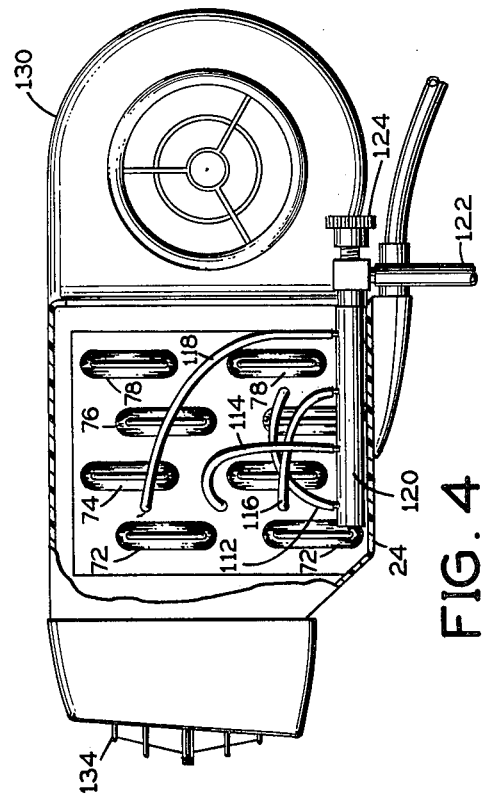
FIG. 6
FIG. 4

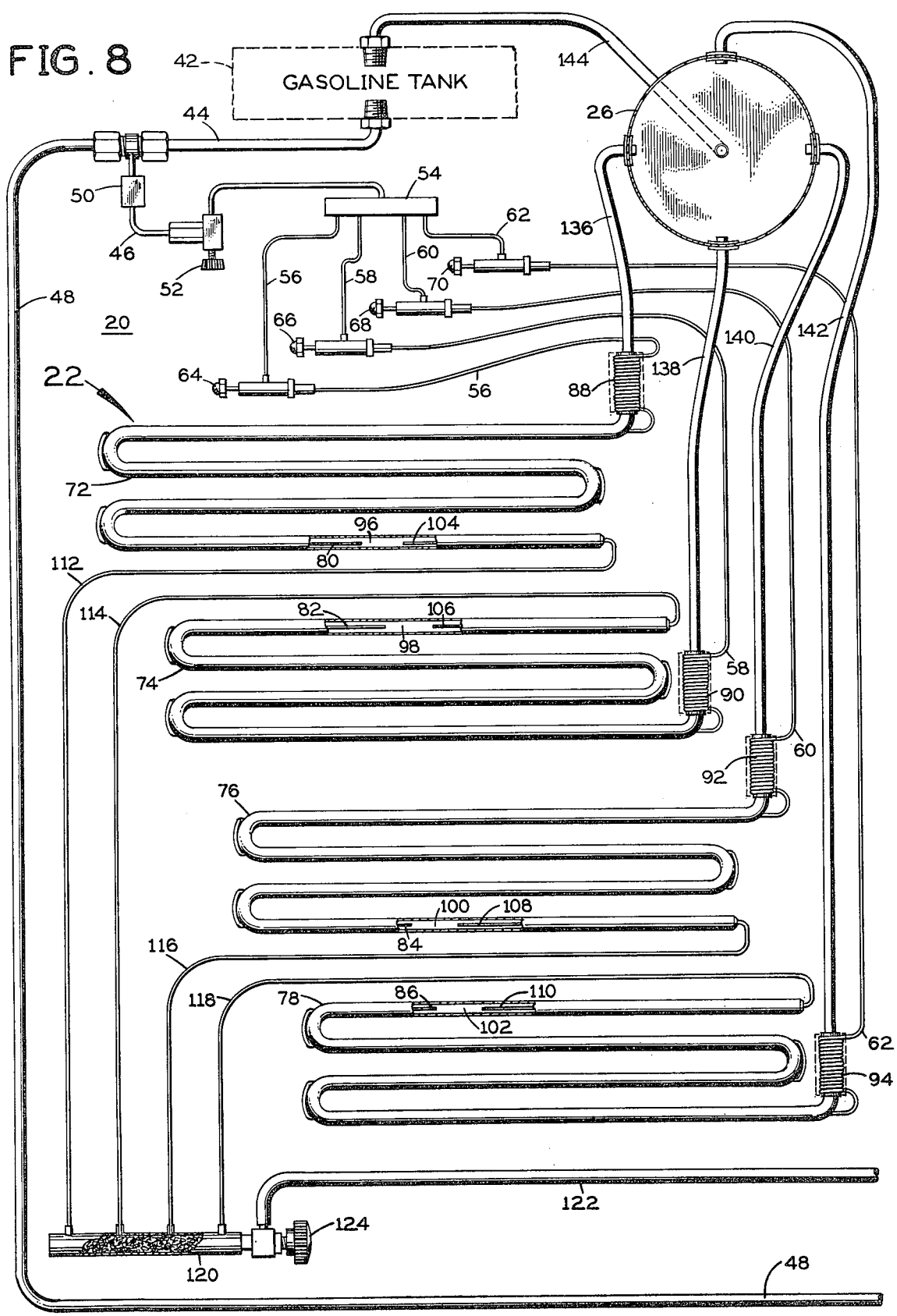

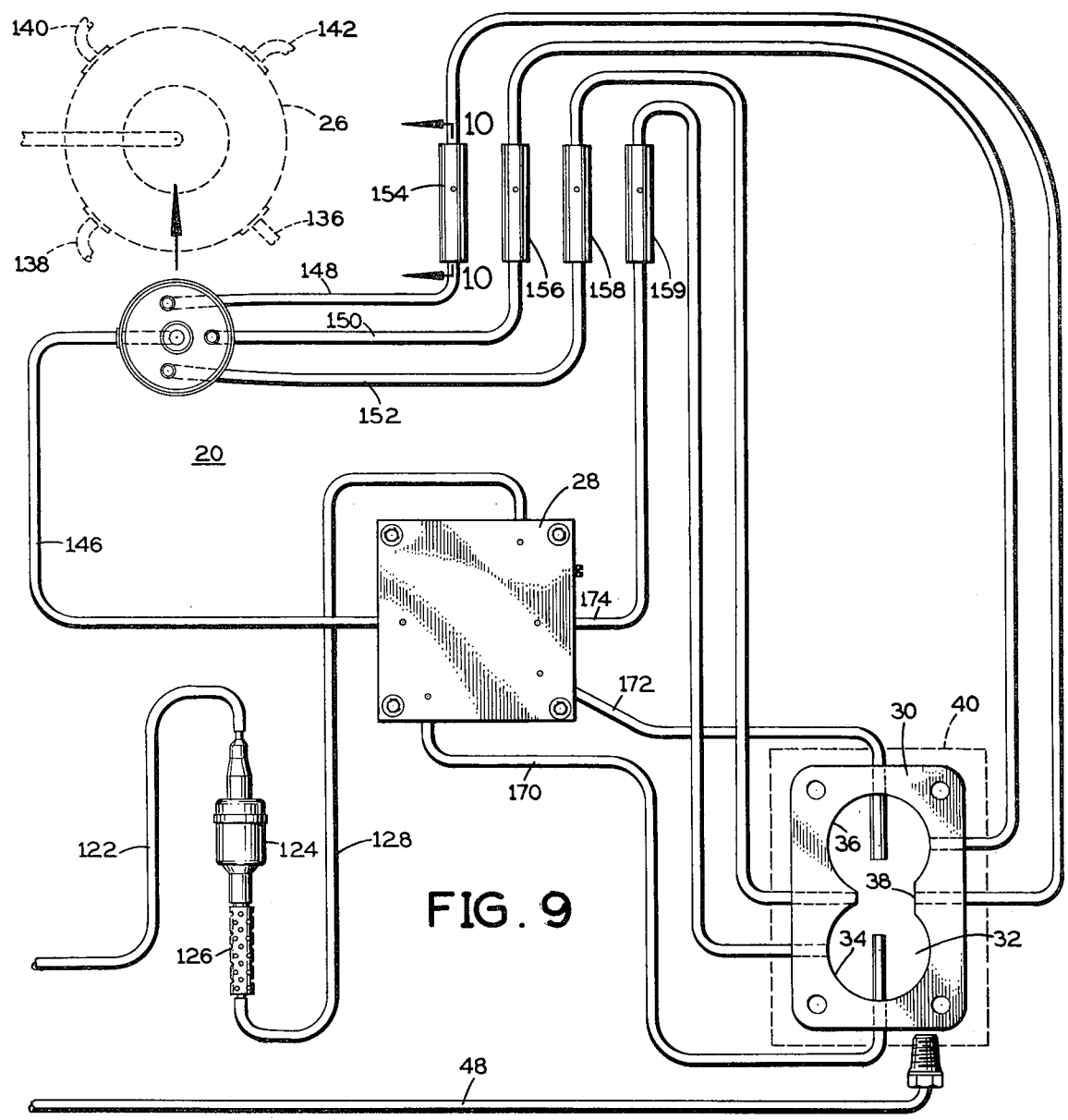
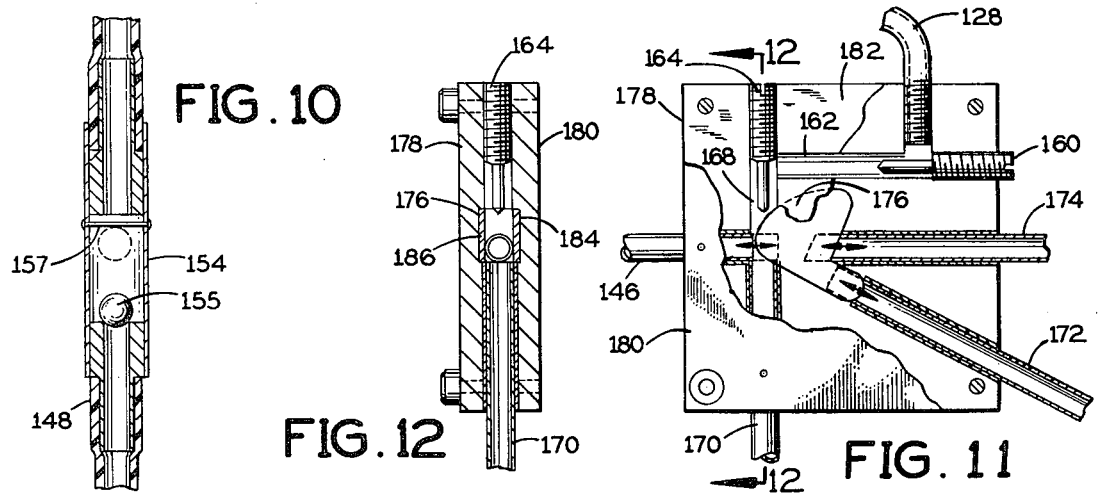

AIR CONDITIONER

RELATED PATENTS

This invention relates to U.S. Pat. Nos. 3,166,912 and 3,605,421 of the present inventor.

BACKGROUND OF THE INVENTION

In the above-identified patents, cooling apparatus is disclosed which utilizes a gasoline vaporizer connected to the fuel system of a vehicle for vaporizing gasoline in a heat exchanger to cool air or liquid outside the vaporizer. The vaporized gasoline is ultimately fed to the engine of the vehicle for combustion.

The present invention is directed to an improved air conditioning apparatus utilizing a gasoline vaporizer of the type disclosed in the aforesaid patents. One of the problems encountered in experience with the apparatus of the patents has been that excess gasoline in the air-gasoline mixture can disrupt the carburetion and combustion of the engine of the vehicle. Unless the gasoline-air mixture is proportioned properly, combustion may be inefficient resulting in pollution. A great deal of emphasis is being placed at the present time on reducing pollution of the atmosphere by automotive vehicles. Accordingly, one of the primary objectives of the present invention is to improve air conditioning apparatus utilizing a gasoline vaporizer in such a way as to reduce pollution caused by improper combustion.

BRIEF DESCRIPTION OF THE INVENTION

The air conditioner of the invention includes a gasoline vaporizer having a first tube and a second tube inside the first tube. Gasoline is supplied from the fuel system of the vehicle through the second tube to a point where the gasoline is vaporized into the first tube. Air is also supplied into the first tube to the point of vaporization. The vaporized gasoline and air are drawn back over the first tube through an exhaust outlet means which ultimately leads to the fuel intake of the engine of the vehicle. On the way to the fuel intake, the gasoline-air mixture passes through a vapor-liquid separator for separating excess gasoline from the mixture and returning the excess gasoline to the fuel system of the vehicle. The mixture also passes through a proportioning device to which raw fuel and air are also fed, and the proportioning device serves to adjust or balance the fuel-to-air ratio at the fuel intake of the engine.

Accordingly, it is an object of the present invention to provide an improved air conditioner in which gasoline is vaporized for cooling purposes and is ultimately fed to the engine of the vehicle for combustion whereby the fuel-to-air mixture is adjusted to improve combustion and reduce pollution.

Another object of the invention is to separate excess gasoline from a gasoline-air mixture returned from a gasoline vaporizer of an air conditioner to the fuel intake of an engine.

Another object of the invention is to provide a proportioning device for adjusting or balancing the fuel-to-air ratio at the fuel intake of the engine.

A further object of the invention is to provide adjustability in the air conditioner for adjustment of air flow and gasoline flow.

Another object of the invention is to provide adjustability in the proportioning device for the air conditioner.

A further object of the invention is to provide a return from a separator of the air conditioner to the fuel system of the vehicle for returning excess gasoline before the gasoline-air mixture is supplied to the engine of the vehicle.

Among the other objects of the invention are to provide an air conditioner which vaporizes gasoline to produce cooling and which supplies the vaporized gasoline to the engine for combustion, and to provide balancing of the fuel-to-air mixture for improving combustion and reducing pollution.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 4 is an elevational view, partly cut away, showing the other end of the air conditioner;

FIG. 5 is a sectional view of the air conditioner taken along line 5—5 of FIG. 2 and looking in the direction of the arrows;

FIG. 6 is a sectional view taken along line 6—6 of FIG. 2 and looking in the direction of the arrows;

FIG. 7 is a vertical sectional view of a separator included in the air conditioner taken along line 7—7 of FIG. 2 and looking in the direction of the arrows;

FIG. 8 is a schematic view of a portion of the air conditioner showing the various flow paths for air and gasoline;

FIG. 9 is a schematic view of another portion of the air conditioner in which the flow paths of FIG. 8 are continued;

FIG. 10 is a vertical sectional view of a valve taken along line 10—10 of FIG. 9 and looking in the direction of the arrows;

FIG. 11 is an elevational view, partly cut away, of a proportioning device included in the air conditioner; and FIG. 12 is a vertical sectional view of the proportioning device taken along line 12—12 of FIG. 11 and looking in the direction of the arrows.

Figure 1:
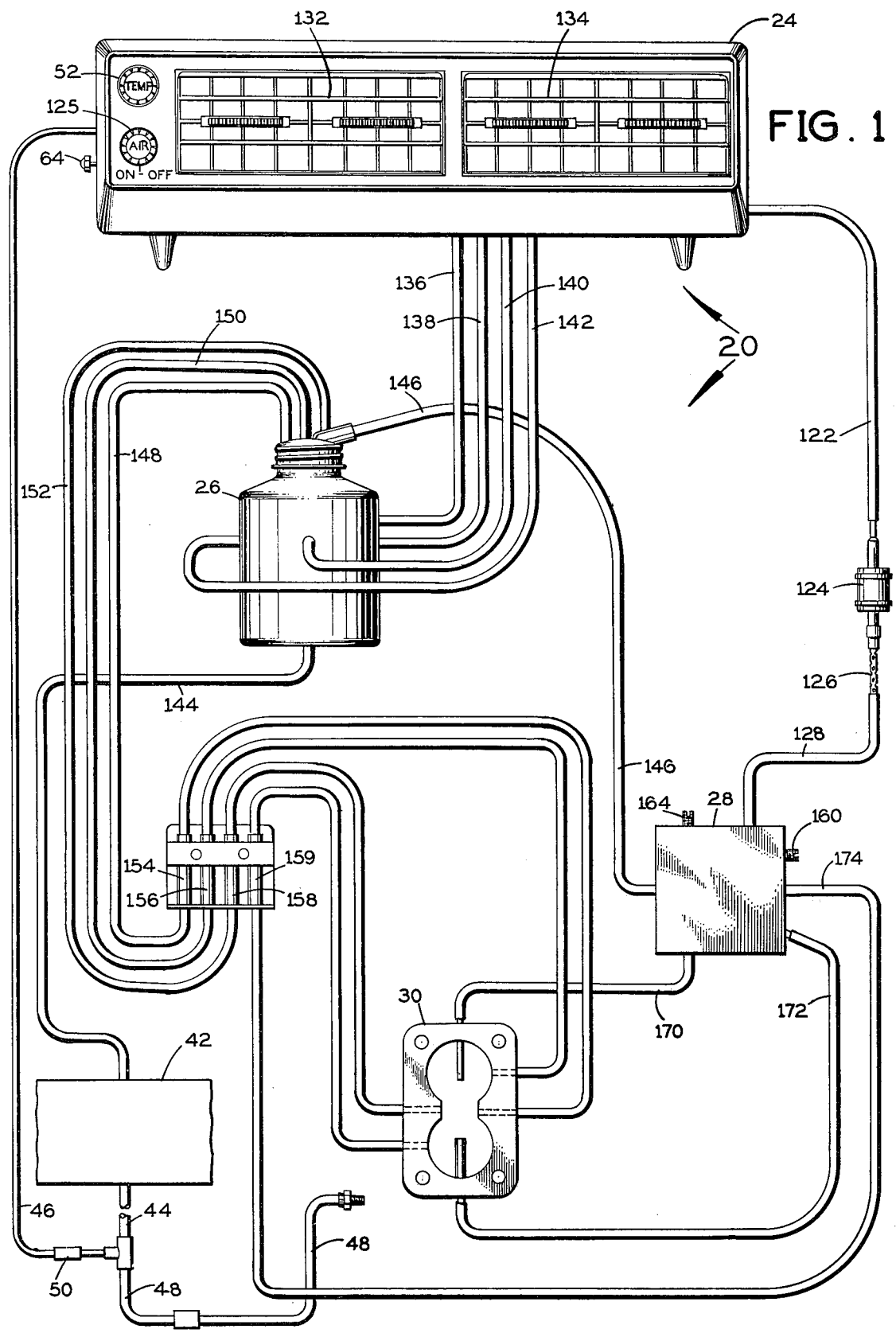
FIG. 1 is a schematic view of an air conditioner in accordance with one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The air conditioner 20 includes a gasoline vaporizer 22 mounted inside a housing 24. Some components of the air conditioner may be mounted outside the housing as indicated in the drawings.

Some of the other main components of the air conditioner are a vapor-liquid separator 26, a proportioning device 28, and a vacuum plate 30. As previously mentioned, the air conditioner is provided for use in an automotive vehicle having a gasoline engine. The engine has a fuel intake manifold which provides a source of reduced pressure. The vacuum plate 30 is affixed on the fuel intake manifold and communicates therewith. The vacuum plate 30 has an opening 32 with two enlarged portions 34 and 36 and a throat portion 38. The carburetor 40 (FIG. 9) of the vehicle is mounted on top of the vacuum plate 30 and the output passage of the carburetor feeds directly into the opening 32 of the vacuum plate 30. Fuel and air from the carburetor flow through the opening 32 into the intake manifold of the engine.

The vehicle also has a gasoline fuel system including a gas tank 42 (FIG. 1) which is the source of gasoline for operating the air conditioner. The gas tank 42 is a non-vented type. A line 44 supplies gasoline from the gas tank to the vaporizer 22 through a branch line 46 and also supplies gasoline to the carburetor 40 and then vacuum plate 30 through another branch line 48.

Line 46 passes through a filter 50 and through a needle valve 52 (FIG. 8) to a reservoir 54 which supplies four inlet lines 56, 58, 60 and 62. The latter lines respectively pass through needle valves 64, 66, 68 and 70. The valve 52 allows course adjustment of the flow rate of gasoline to the vaporizer 22, and valves 64, 66, 68 and 70 allow fine adjustment of the flow of gasoline to the individual coils of the vaporizer.

Figure 2:
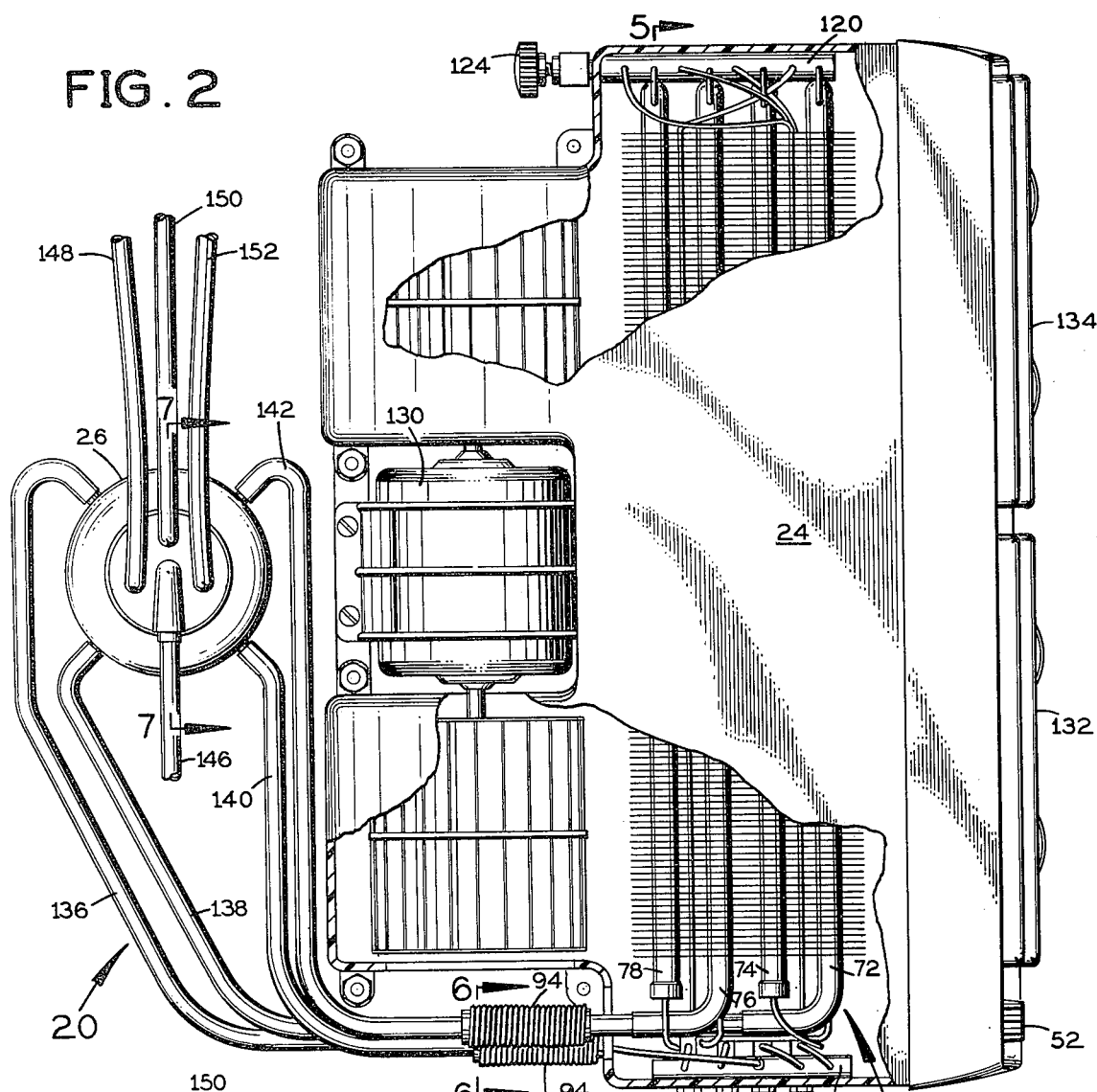
FIG. 2 is a top plan view of the air conditioner.
Figure 3:
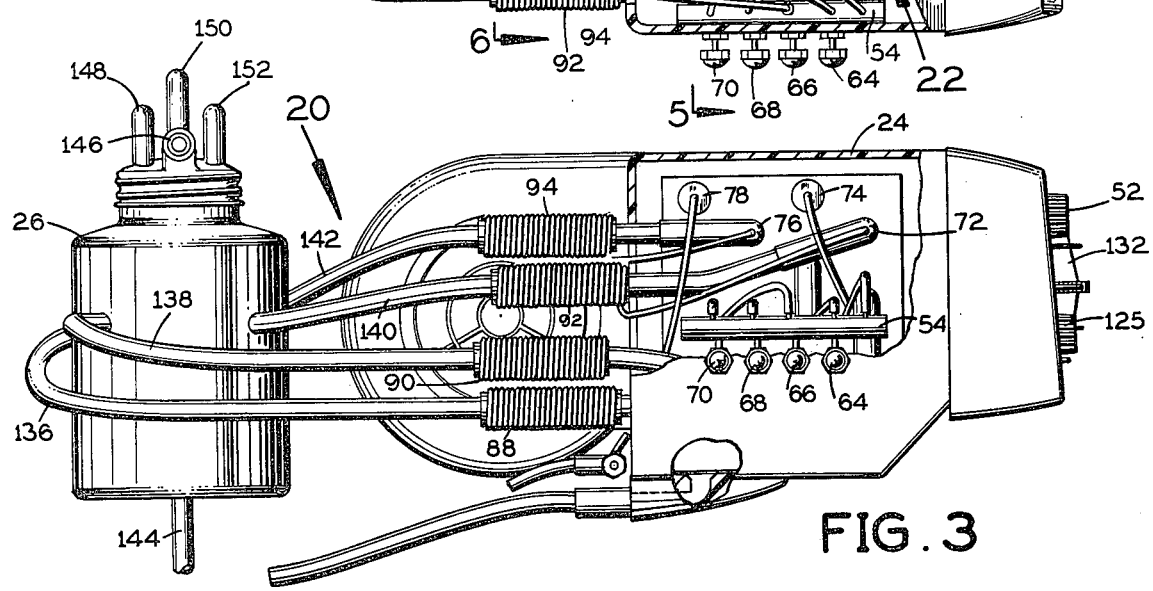
FIG. 3 is an end elevational view, partly in section of the air conditioner.

The vaporizer 22 includes four outer tubes 72, 74, 76 and 78, each in the form of a coil. As shown in FIGS. 2 and 5, these coils are provided with fins such as 80 for improving heat transfer. Inlet line 56 leads into coil 72, inlet line 58 leads into coil 74, inlet line 60 leads into coil 76 and inlet line 62 leads into coil 78. Each of these inlet lines connects to an inner tube which is located inside the outer tube of the coil. In FIG. 8, the inner tube 80 is inside and spaced from the wall of outer tube 72. Inner tubes 82, 84 and 86 are respectively inside outer tubes 74, 76 and 78, and each inner tube is spaced from the wall of the outer tube. The inner tubes extend through most of the length of the outer tubes.

Line 56 includes a pre-cooling coil 88, line 58 includes a pre-cooling coil 90, line 60 includes a pre-cooling coil 92 and line 62 includes a pre-cooling coil 94.

Gasoline discharges from the tip of tube 80 and vaporizes in the space at 96. Similarly, gasoline discharges from the tips of tubes 82, 84 and 86 and vaporizes in the spaces 98, 100, and 102. Air is fed to the spaces 96, 98, 100 and 102 through tubes 104, 106, 108 and 110. The latter tubes are inside the respective outer tubes, and they connect to air inlet lines 112, 114, 116 and 118 respectively. The latter lines lead to a common reservoir 120. An air inlet line 122 feeds through a needle valve 124 to the reservoir 120, and valve 124 allows for adjustment of the flow rate of the incoming air. Line 122 connects through a vacuum operated valve 124 to an air filter 126 through which fresh air is supplied into the system. It may be noted at this point that another line 128 leads from the air filter 126 to the proportioning device 28 as will be described further.

The air which comes in through tubes 104, 106, 108 and 110 mixes with the gasoline emerging from tubes 80, 82, 84 and 86 so that the gasoline vaporizes in the spaces 96, 98, 100 and 102. The gasoline-air mixture resulting from this vaporization is drawn back over the outside of the inner tubes 80, 82, 84 and 86 through the outer tubes 72, 74, 76 and 78. The reduced pressure for drawing the air-gasoline mixture through these paths is derived from the vacuum plate 30 which receives vacuum or reduced pressure from the fuel intake of the engine of the vehicle.

It may be noted that the vaporization of the gasoline which has just been described produces a cooling effect which cools the outer tubes 72, 74, 76 and 78. The inner tubes 80, 82, 84 and 86 are also cooled. Thus, the incoming gasoline is pre-cooled to facilitate vaporization, and the atmosphere around the outside of the outer tubes 72, 74, 76 and 78 is also cooled.

A blower 130 is mounted in the housing 24 (FIG. 2) and serves to blow air across the outer tubes or coils 72, 74, 76 and 78. Since the latter tubes have been cooled by the vaporized gasoline, the air is cooled by heat transfer. The cooled air circulates through the vehicle for air conditioning purposes. The cooled air emerges from the air conditioner through grills 132 and 134 located at the front of the housing 24.

It may be noted that the knob of the valve 52 is mounted on the front of the housing 24 (FIG. 1) and a control knob 125 is also mounted on the front of the housing 24. Valve 52 provides a rough temperature control, and knob 125 is utilized to turn the blower on and off.

The gasoline-air mixture in the tubes 72, 74, 76 and 78 passes respectively through exhaust outlets 136, 138, 140 and 142 to the vapor-liquid separator 26. The latter exhaust outlets enter the separator about half way up the side of the separator as indicated in FIG. 7.

In the separator 26, excess gasoline is condensed and allowed to collect at the bottom of the separator. This excess gasoline flows through a return conduit 144 to the top of the gasoline tank 42. By separating out excess gasoline in this manner, the possibility of having excess gasoline in the fuel-air mixture supplied for the carburetion is greatly reduced. This helps to assure that the engine of the vehicle will have efficient combustion so that polluting emissions from the engine will be reduced.

Several lines lead out the top of the vapor-liquid separator 26. A balancing line 146 comes out of the separator at an angle as indicated in FIG. 7. This balancing line 146 leads directly to the proportioning device 28. The other lines 148, 150 and 152 lead through vacuum operated valves 154, 156 and 158 to the vacuum plate 30.

The proportioning device 28 has several inlets. As previously mentioned, air inlet 128 feeds into the top of the proportioning device through a needle valve 160. This incoming air flows through a passage 162 and another needle valve 164 to a control passage 168 which passes transversely directly in front of the balancing line inlet 146.

There are three vacuum inlets 170, 172 and 174 leading from the vacuum plate 30 to the proportioning device 28. Vacuum inlet 170 leads directly into the control channel 168 to apply reduced air pressure directly to the tip of the balancing line inlet 146. Vacuum inlet 174 leads horizontally into the proportioning device, and vacuum line 172 leads into the proportioning device at an acute angle relative to line 174.

Inside the proportioning device, there is a heart shaped chamber 176. The proportioning device may have two side plates 178 and 180 which are sealed by a neoprene gasket 182. The chamber 176 has two halves formed respectively in the plates 178 and 180.

One side of the chamber 176 is covered by a first heart shaped plate 184 (FIG. 12) and the other side of the chamber 176 is covered by a second heart shaped plate 186. In some embodiments, one or both of these heart shaped plates may be omitted. Note that all of the inlets 128, 146, 170, 172 and 174 enter the chamber 176 between plates 186 and 184 and all of the inlets are adjustable longitudinally.

In the operation of the proportioning device, reduced pressure is applied to the chamber 176 at the control passage which passes transversely directly in front of the tip of the balancing line inlet 146. Mostly air flows through the inlet 170 to the vacuum plate 30. A mixture of fuel and air flows through inlets 172 and 174 to the vacuum plate 30. When pressure drops in the intake manifold, the proportioning device diverts a proportional amount of vaporized fuel into the inlets 170, 172 and 174. In response to a vacuum or pressure change, the proportioning device switches the flow of liquid, air and vapor from one passage to another almost immediately. Therefore, working in conjunction with the vapor-liquid separator, the proportioning device balances out the fuel-to-air ratio to the intake manifold. This helps to assure smooth combustion in the engine and also helps to reduce polluting emissions.

As previously mentioned, condensed fuel is fed back from the separator 26 to the gasoline tank. Therefore, the condensed fuel is not vaporized and supplied to the intake manifold. This should also help to reduce polluting emissions.

FIG. 10 illustrates the vacuum operated valve 154. The valve is simply a check valve utilizing a ball 155 for closing off any backward flow through line 148. A pin 157 extends partly across the other outlet for the valve 154 to prevent the ball 155 from seating against that outlet. There is a similar valve 159 in line 174.

Thus, the invention provides an improved air conditioner which features air pollution control. The air conditioner includes a proportioning device and a vapor-liquid separator which together adjust or balance the fuel-to-air ratio in the intake manifold of the engine of the vehicle. The fuel-to-air ratio is properly adjusted for efficient combustion without allowing excess gasoline vapors to enter the engine.

I claim:
1. An air conditioner for use in a vehicle having a gasoline engine with a fuel intake providing a source of reduced pressure comprising:
  1. a gasoline vaporizer including
    a. a first tube,
    b. a second tube within and spaced from the wall of said first tube,
    c. gasoline inlet means leading into said second tube for supplying gasoline thereto from the fuel system of the vehicle, said second tube discharging gasoline into said first tube to vaporize the same,
    d. air inlet means leading into said second tube for discharging air where the gasoline is vaporized, and
    e. exhaust outlet means for said first tube adapted to communicate with said fuel intake and draw a gasoline-air mixture through said first tube over a substantial length of said second tube for cooling purposes,
  2. blower means for blowing air across said first tube to cool the air for circulation in the vehicle,
  3. vapor-liquid separator means connected between said exhaust outlet means and said fuel intake for separating excess gasoline from the gasoline-air mixture and returning the same to the fuel system of the vehicle, and
  4. proportioning means connected between said separator and said fuel intake for mixing air supplied from said air inlet means with said mixture responsive to reduced pressure at said fuel intake to adjust the fuel-to-air ratio at the fuel inlet.

2. The air conditioner as claimed in claim 1 in which said gasoline inlet means includes adjustable valve means for adjustment of the incoming air flow to said vaporizer.

3. The air conditioner as claimed in claim 2 in which said air inlet means includes adjustable valve means for adjustment of the incoming air flow to said vaporizer.

4. The air conditioner as claimed in claim 3 in which said valve means of said gasoline inlet means includes a first valve for coarse adjustment and a second valve for fine adjustment.

5. The air conditioner as claimed in claim 4 in which said air inlet means further includes a vacuum operated on-off valve.

6. The air conditioner as claimed in claim 5 in which said air inlet means further includes an air filter.

7. The air conditioner as claimed in claim 1 in which said proportioning means has a first inlet for supplying air thereto from said air inlet means, a second inlet for supplying gasoline thereto from said fuel system, a third inlet for supplying the gasoline-air mixture thereto from said separator, and a fourth inlet cooperating with said third inlet for applying reduced pressure thereto from said fuel intake.

8. The air conditioner as claimed in claim 7 in which said proportioning means further has fifth and sixth inlets from said fuel intake for supplying the adjusted gasoline-air mixture to said fuel intake.

9. The air conditioner as claimed in claim 8 in which said inlets for said proportioning device are adjustable.

10. The air conditioner as claimed in claim 9 in which said proportioning means includes a chamber into which said inlets lead.

11. The air conditioner as claimed in claim 10 in which said chamber is heart shaped.

12. The air conditioner as claimed in claim 11 in which said heart shaped chamber has a tip between two sides thereof, and said third inlet is located at said tip.

13. The air conditioner as claimed in claim 12 in which said fourth inlet is transverse to said third inlet and terminates close to said third inlet.

14. The air conditioner as claimed in claim 13 in which said heart shaped chamber has an apex between two sides thereof and said fifth inlet is located adjacent to said apex.

15. The air conditioner as claimed in claim 14 in which said sixth inlet is located next to said fifth inlet at an acute angle with respect to the same.

16. The air conditioner as claimed in claim 15 in which said chamber has a first heart shaped plate covering one side of said chamber.

17. The air conditioner as claimed in claim 16 in which said chamber has a second heart shaped plate covering the opposite side of said chamber.

18. The air conditioner as claimed in claim 17 in which all of said inlets of said proportioning means are located between said plates.

19. An air conditioner for use in a vehicle having a gasoline engine with a fuel intake providing a source of reduced pressure comprising:

a gasoline vaporizer including a first outer tube, and a second inner tube within said first tube for discharging gasoline from the fuel system of the vehicle into said first tube to vaporize the same, blower means for flowing air across said first tube to cool the air for circulation in the vehicle, air inlet means to supply air to said first tube, exhaust outlet means for said first tube, vapor-liquid separator means connected between said exhaust outlet means and said fuel intake for separating excess gasoline from the mixture, and proportioning means connected between said separator and said fuel intake for adjusting the fuel-to-air ratio at the fuel inlet.

20. The air conditioner as claimed in claim 19 in which said proportioning means has a first inlet supplying air thereto from said air inlet means, a second inlet for supplying gasoline thereto from said fuel system, a third inlet for supplying the gasoline-air mixture thereto from said separator, and a fourth inlet cooperating with said third inlet for applying reduced pressure thereto from said fuel intake.

21. The air conditioner as claimed in claim 20 in which said proportioning means further has fifth and sixth inlets from said fuel intake for supplying the adjusted gasoline-air mixture to said fuel intake.

22. The air conditioner as claimed in claim 21 in which said inlets for said proportioning means are adjustable.

23. The air conditioner as claimed in claim 21 in which said proportioning means includes a chamber into which said inlets lead.

24. The air conditioner as claimed in claim 23 in which said chamber is heart shaped.

25. The air conditioner as claimed in claim 23 in which said chamber has a first heart shaped plate covering one side of said chamber.

26. The air conditioner as claimed in claim 25 in which said chamber has a second heart shaped plate covering the opposite side of said chamber.

27. The air conditioner as claimed in claim 26 in which all of said inlets of said proportioning means are located between said plates.

28. The air conditioner as claimed in claim 27 in which said heart shaped chamber has a tip between two sides thereof, and said third inlet is located at said tip.

29. The air conditioner as claimed in claim 28 in which said fourth inlet is transverse to said third inlet and terminates close to said third inlet.

30. The air conditioner as claimed in claim 29 in which said heart shaped chamber has an apex between two sides thereof and said fifth inlet is located adjacent to said apex.

31. The air conditioner as claimed in claim 30 in which said sixth inlet is located next to said fifth inlet at an acute angle with respect to the same.

* * * * *